(12) United States Patent
Reim et al.

(10) Patent No.: US 7,229,099 B2
(45) Date of Patent: Jun. 12, 2007

(54) CHASSIS AUXILIARY-FRAME ARRANGEMENT FOR IMPROVING THE SAFETY IN A CRASH

(75) Inventors: Joerg Reim, Cologne (DE); Dirk van Oirschot, Luettelforst-Schwalmtal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 10/925,512

(22) Filed: Aug. 25, 2004

(65) Prior Publication Data

US 2005/0046166 A1   Mar. 3, 2005

(30) Foreign Application Priority Data

Aug. 25, 2003   (EP)   ................................ 03103221

(51) Int. Cl.
*B62D 21/15*   (2006.01)
(52) U.S. Cl. ............................. 280/784; 280/124.109; 180/274
(58) Field of Classification Search ................ 280/784, 280/124.109; 296/187.09, 204; 180/311, 180/312, 274, 232
See application file for complete search history.

(56) References Cited

U.S. PATENT DOCUMENTS

| | | | |
|---|---|---|---|
| 3,774,712 A | * | 11/1973 | Froumajou .................. 180/232 |
| 5,884,963 A | | 3/1999 | Esposito et al. |
| 6,109,654 A | | 8/2000 | Yamamoto et al. |
| 6,367,869 B1 | | 4/2002 | Baccouche et al. |
| 6,679,523 B2 | * | 1/2004 | Yamamoto et al. .......... 280/785 |
| 6,722,696 B2 | * | 4/2004 | Sonomura et al. .......... 280/784 |
| 6,761,242 B2 | * | 7/2004 | Yoshida et al. .............. 180/298 |
| 6,997,276 B2 | * | 2/2006 | Yoshida et al. .............. 180/232 |
| 2005/0189788 A1 | * | 9/2005 | Cornell et al. .......... 296/187.09 |
| 2006/0181071 A1 | * | 8/2006 | Mitsui et al. ................ 280/784 |

FOREIGN PATENT DOCUMENTS

| | | |
|---|---|---|
| DE | 41 34 267 A | 4/1992 |
| JP | 2001310755 | 11/2001 |

* cited by examiner

*Primary Examiner*—Paul N. Dickson
*Assistant Examiner*—Drew J. Brown
(74) *Attorney, Agent, or Firm*—Fredrick Owens

(57) ABSTRACT

A chassis auxiliary-frame arrangement on a preferably self-supporting vehicle body is designed for improving the safety in a crash in such a manner that, in a frontal impact of the vehicle, the deformation zones of the vehicle body can be adequately and uniformly deformed without interference from the chassis auxiliary frame in order thereby to achieve a greater effective crash length of the deformation zones of the body. For this purpose, the chassis auxiliary-frame has devices for fastening it to the vehicle body, which devices, during a frontal impact of the vehicle, are completely detached above a certain degree of deformation of the deformation zones of the body, the chassis auxiliary-frame is therefore completely decoupled from the body and is pushed under the passenger cell 9 by means of a ramp.

11 Claims, 5 Drawing Sheets

CHASSIS AUXILIARY-FRAME ARRANGEMENT FOR IMPROVING THE SAFETY IN A CRASH

BACKGROUND OF THE INVENTION

This invention relates to a chassis auxiliary-frame arrangement on a preferably self-supporting vehicle body for improving the safety in a crash.

Modern vehicle bodies are equipped in the region of the front wheel suspension with a very stiff chassis auxiliary frame, which improves the absorption of transverse forces and therefore the track stability of the vehicle. In addition, in this construction, during the assembly of the vehicle the complete drive train including the front wheel suspension can be fitted, in an advantageous manner in terms of production, as a complete assembly module into the vehicle body.

However, problems arise from this construction with regard to the safety of the vehicle occupants in a crash. The prior art has therefore disclosed, for the protection of the occupants, in particular in a frontal impact of the vehicle, a multiplicity of measures in which plastic deformation of body parts results in the kinetic energy of the vehicle being converted into deformation energy and the intention is thus to prevent the occupants from accelerating too severely. However, if a chassis auxiliary-frame is fitted, the stiffness of the latter, which is actually desirable in order to improve the track stability, prevents the deformation zones of the body (for example the longitudinal members) from being able to be adequately deformed in the region of the auxiliary frame. In addition, there is the risk that, in a very severe impact, the auxiliary-frame or parts of it will be pressed into the passenger cell, and an additional risk of injuries therefore arises.

U.S. Pat. No. 5,884,963 discloses a body structural element which, in a frontal impact of the vehicle, firstly absorbs kinetic energy, by means of its specific deformation, and, secondly, directs a chassis auxiliary frame under the passenger cell as the deformation continues. Although the auxiliary-frame is therefore prevented from penetrating the passenger cell, the disadvantage of this invention is that the deformation zones of the body cannot be adequately and uniformly deformed in the region of the auxiliary frame on account of the rigidity thereof.

Therefore also in the energy conversion method disclosed in U.S. Pat. No. 6,367,869, the chassis auxiliary-frame remains in the region of the deformation zones of the body after a frontal impact and thus prevents their adequate and uniform deformation. Only the rear part of the auxiliary frame is detached here from the body by means of a deformable auxiliary fastening plate in order thereby to prevent the auxiliary frame from penetrating the passenger cell.

U.S. Pat. No. 6,109,654 discloses a shock-absorbing vehicle structure in which rear fastenings of a chassis auxiliary frame become detached one after another in a specifically defined manner resulting in the deformation of the left and right body and auxiliary-frame parts. It discloses that the result of the overall acceleration/deceleration peaks or values experienced by the vehicle occupants are lessened when the resultant acceleration peaks are experienced successively. However, this does not alter the fact that here too the relatively stiff auxiliary-frame parts remain in the region of the deformation zones of the body and therefore prevent their adequate and uniform deformation.

SUMMARY OF INVENTION

The present invention provides a chassis auxiliary-frame arrangement on a preferably self-supporting vehicle body having a pair of laterally-spaced, longitudinal support members for improving safety during an impact comprising a chassis auxiliary frame, two front means for fastening the chassis auxiliary frame to each longitudinal member, two rear means for fastening the chassis auxiliary frame to the vehicle body comprising a pair of fastening plates weakened in a defined manner with respect to longitudinal force by structural means, and a ramp device. The fastening means are sheared off after a certain relative force between the longitudinal members and chassis auxiliary frame. The entire chassis auxiliary frame is pushed under a passenger cell when the vehicle is severely deformed in a frontal impact.

It is an object of the invention to provide a chassis auxiliary-frame arrangement for vehicles which makes it possible, in a frontal impact of the vehicle, for the deformation zones of the vehicle body to be able to be adequately and uniformly deformed without interference from the chassis auxiliary-frame in order thereby to achieve a greater effective crash length of the deformation zones of the body.

It is furthermore the object of the invention to design the chassis auxiliary-frame arrangement in such a manner that as deformation of the vehicle continues, the chassis auxiliary-frame cannot be pressed into the passenger cell.

According to the invention, this object is achieved by the chassis auxiliary-frame arrangement according to the defining features of the independent patent claims. Advantageous embodiments of the invention are described in the defining features of the dependent claims.

For this purpose, the devices for fastening the chassis auxiliary frame to the vehicle body are designed in such a manner that, during a frontal impact of the vehicle, they become completely detached above a certain degree of deformation of the deformation zones of the body. The chassis auxiliary-frame is therefore completely decoupled from the body and is pushed under the passenger cell by means of a ramp.

In one advantageous refinement of the invention, the chassis auxiliary-frame is connected to the body at four points, specifically at the two front points by means of a support pipe and a shearing-screw connection to the longitudinal member, and at the two rear points by means of a fastening plate which is weakened or buckled in a specific manner by holes, for example, and buckles away rearward above a certain longitudinal force, and by means of screw connections to the underbody structure of the body.

The invention makes it possible to differentiate a number of deformation phases during a frontal impact of the vehicle. These include: deformation only of the deformation zones of the body, such as the longitudinal members; the start of the deformation of the rear fastening plate, further deformation of the longitudinal members; the shearing off of the front points for fastening the chassis auxiliary frame to the longitudinal member, further deformation of the longitudinal members and of the rear fastening plate; the complete detachment of the chassis auxiliary frame at the rear fastening plate after the latter has completely buckled away, further deformation of the longitudinal members; and the pushing away the entire chassis auxiliary frame under the passenger cell by means of a sheet-metal ramp.

This behavior of the chassis auxiliary-frame arrangement is very advantageous within the context of the invention has the effect that, in contrast with the previous prior art, a very much larger region of the body can act effectively as a deformation zone, with the result that, firstly, the accelerations on the vehicle occupants during a frontal impact can be reduced or, secondly, even with a greatly reduced overall length of the crash region, the accelerations on the vehicle occupants can be kept to the current level.

The objects on which the invention is based are therefore achieved in full by the chassis auxiliary-frame arrangement which is provided.

BRIEF DESCRIPTION OF THE DRAWINGS

A preferred exemplary embodiment of the invention will be explained below in further detail with reference to the attached drawings, in which.

DETAILED DESCRIPTION OF THE PREFERRED EMBODIMENTS

Figure 1:
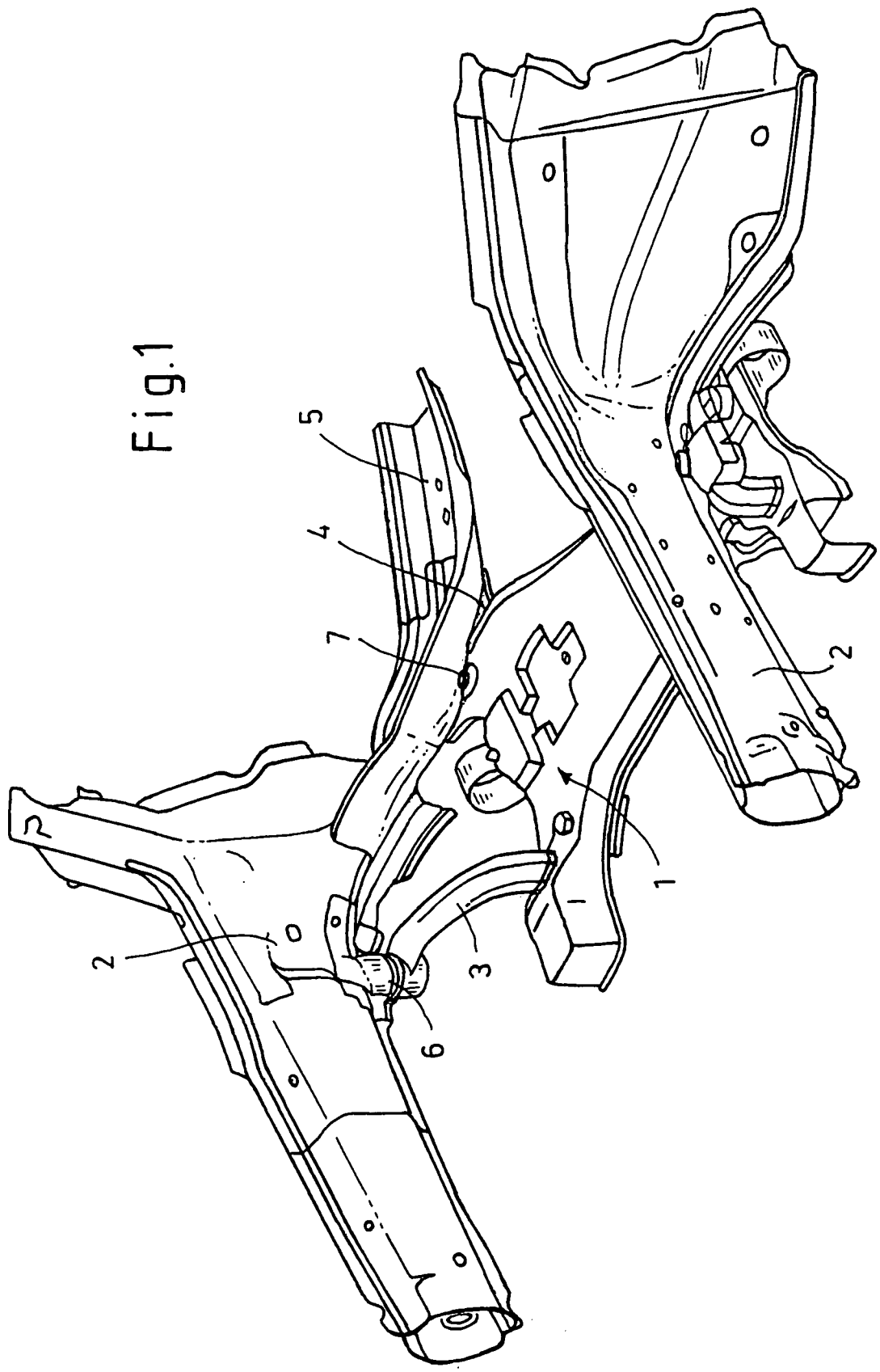
FIG. 1 shows a perspective view of a chassis auxiliary-frame arrangement according to the invention.
Figure 2:
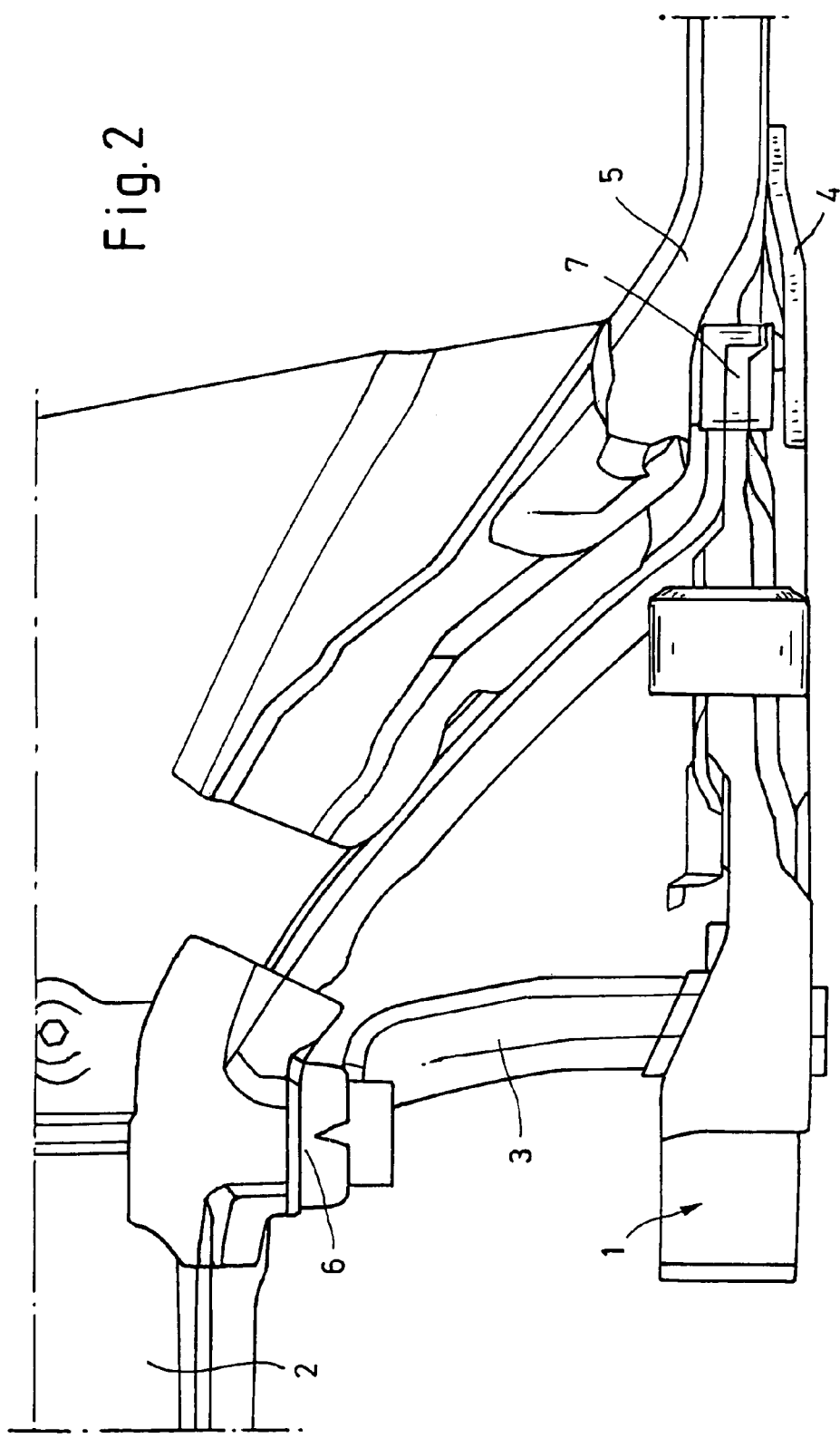
FIG. 2 shows a side view of a chassis auxiliary-frame arrangement according to the invention.
Figure 3:
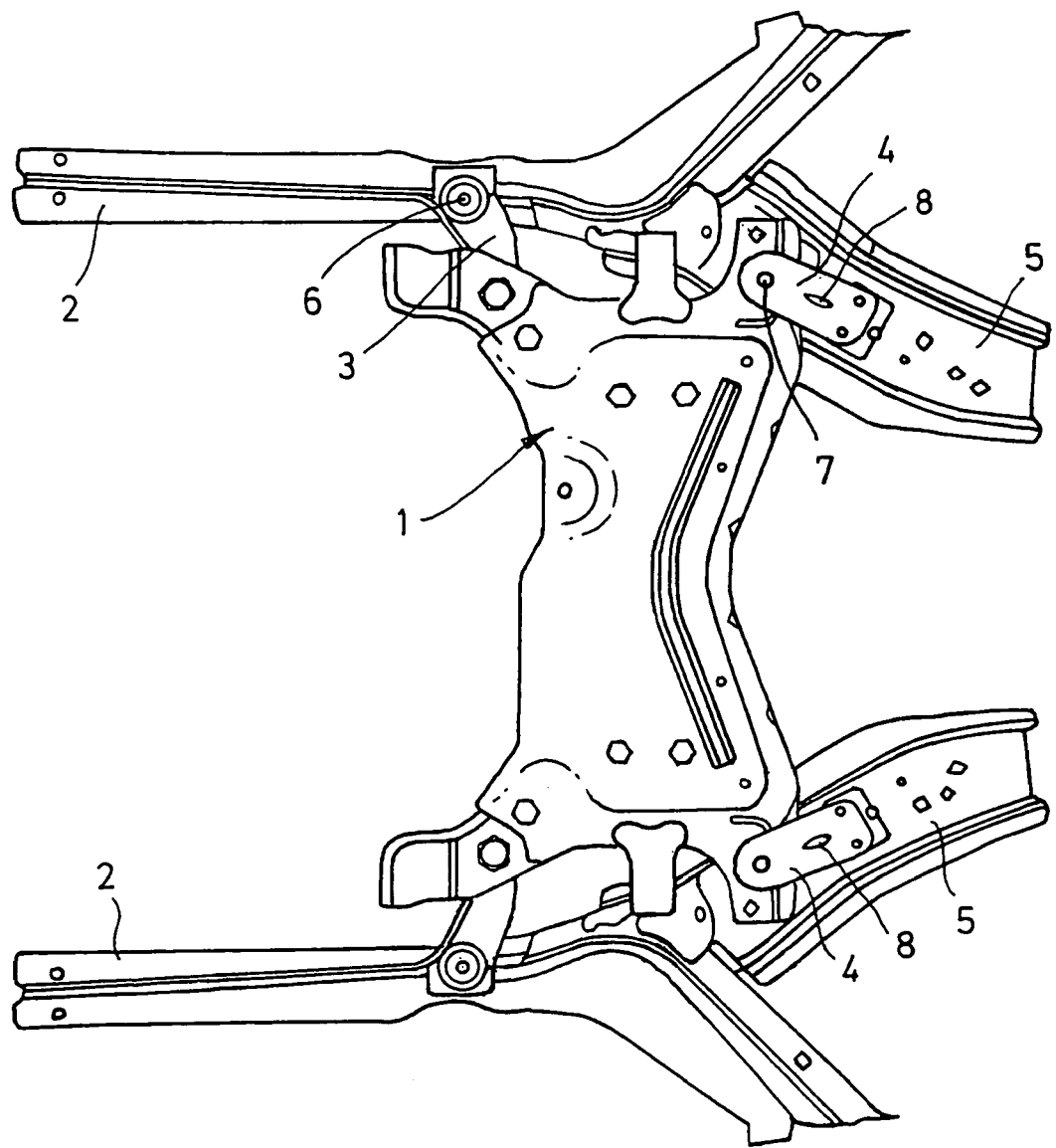
FIG. 3 shows a chassis auxiliary-frame arrangement according to the invention in plan view.

FIGS. 1 to 3 show the chassis auxiliary-frame 1 in the front region of a vehicle, said frame forming the downward boundary of the engine compartment and to which is laterally fastened the front wheel suspension, which comprises a front axle frame and is connected to the body by a spring and shock absorber device. The chassis auxiliary frame is fastened to the body at four points, specifically at the front by means of a support pipe 3 and a shearing-screw connection 6 to the longitudinal member 2 and at the rear via a fastening plate 4, which is weakened in a specific manner by holes 8, by means of a screw connection 7 to the underbody structure of the passenger cell 9. During a substantial deformation caused by a frontal impact, the ramp 5 directs the chassis auxiliary-frame 1 under the underbody structure of the passenger cell 9.

The different deformation phases in the event of a frontal impact of the vehicle can now be differentiated. Firstly, at the start of the impact, the bumper, bumper support and front body parts, such as the radiator support and wheel houses, are deformed followed by the deformation zones of the longitudinal members 2 beginning to deform.

Figure 4:
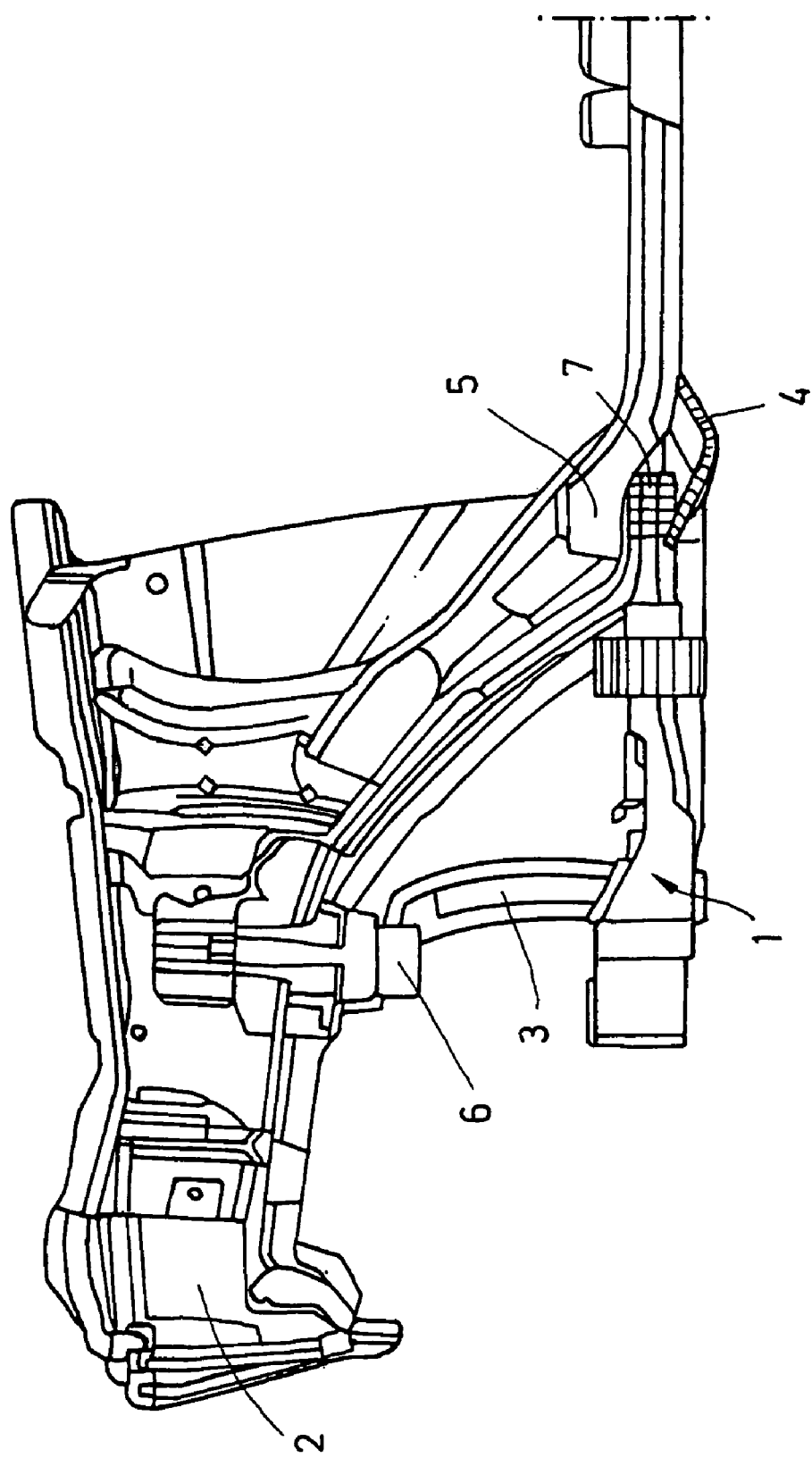
FIG. 4 shows the start of the deformation of the rear fastening plate and the further deformation of the longitudinal members.

Since the deformation zones of the longitudinal members 2 continue to be deformed, then, as illustrated in FIG. 4, the chassis auxiliary frame 1 is displaced rearward, as a result of which the rear fastening plate 4 begins to buckle in the region of the weakening hole 8.

Figure 5:
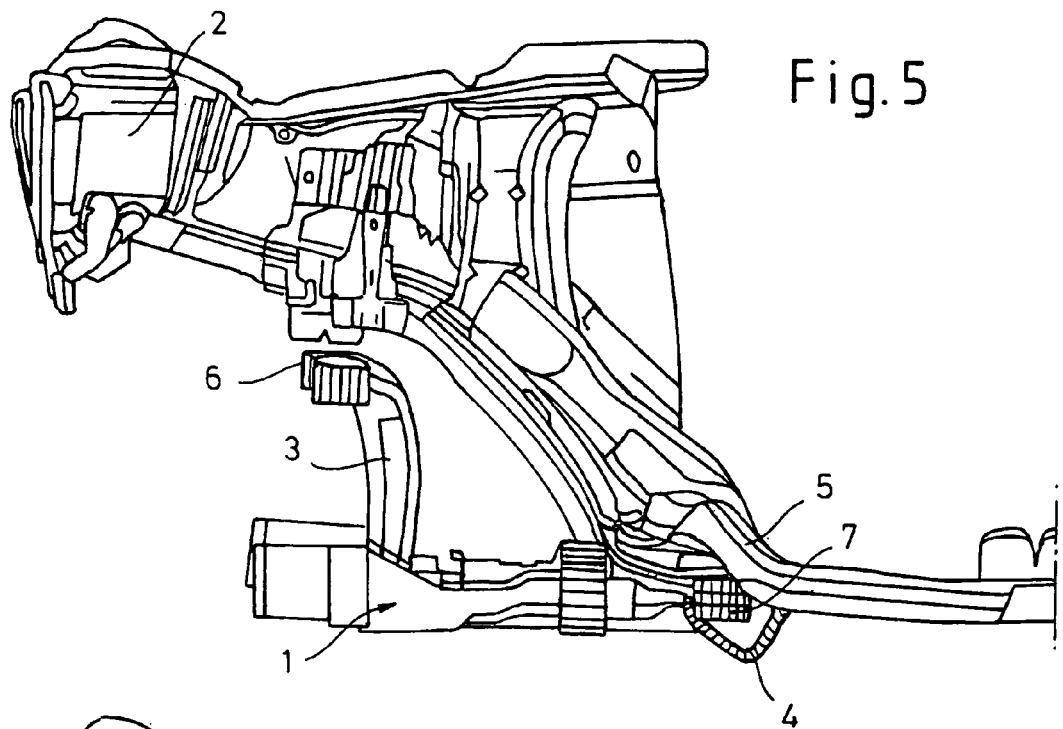
FIG. 5 shows the shearing off of the front points for fastening the chassis auxiliary frame to the longitudinal member and the continuing deformation of the longitudinal members and the rear fastening plate.

FIG. 5 shows how this leads to a relative movement between the chassis auxiliary frame 1 and longitudinal member 2 resulting in the shearing off of the front shearing-screw connections 6 of the support plate 3 at the longitudinal members 2. The deformation zones of the longitudinal members 2 and the rear fastening plates 4 continue to be deformed in the process.

Figure 6:
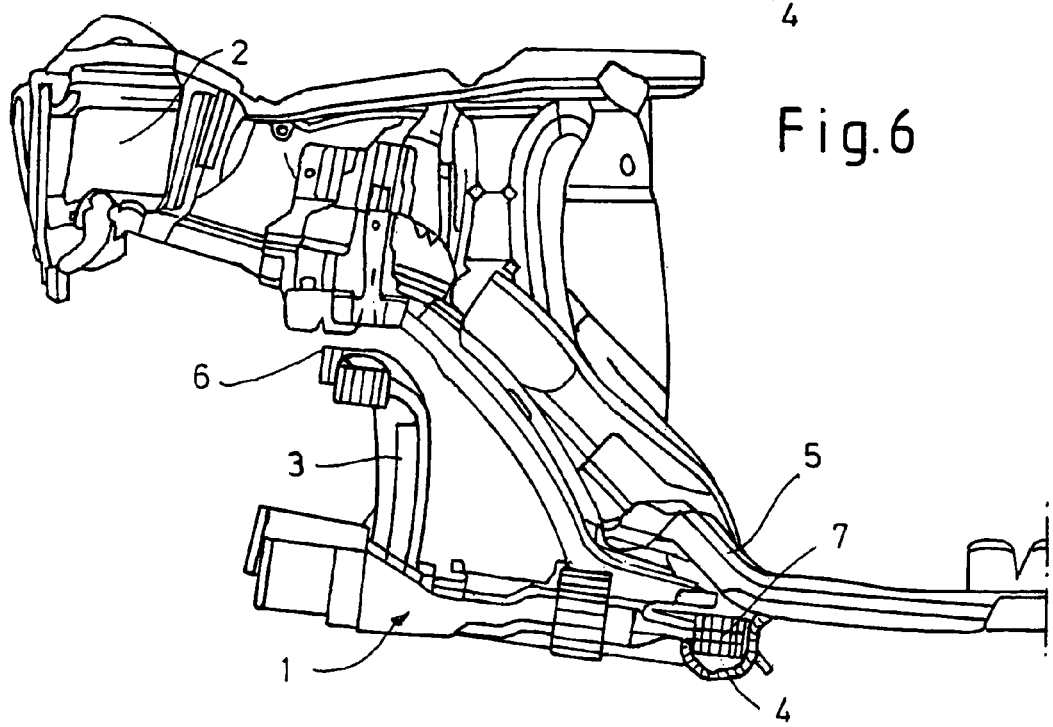
FIG. 6 shows the complete detachment of the chassis auxiliary frame at the rear fastening plate after the latter has completely buckled away, the further deformation of the longitudinal members, and the pushing away of the entire chassis auxiliary frame under the passenger cell.

As can be seen from FIG. 6, this is followed by the chassis auxiliary frame 1 becoming completely detached at the rear fastening plate 4 after the latter has completely buckled away. In the process, the deformation zones of the longitudinal members 2 and the rear fastening plates 4 continue to be deformed.

As can furthermore be seen from FIG. 6, finally the entire chassis auxiliary-frame 1 is pushed under the passenger cell 9 by means of a sheet-metal ramp or ramp device 5.

The exemplary embodiment shown in FIGS. 1 to 6 of a chassis auxiliary-frame arrangement can be used, as is rapidly apparent, in the same manner for a vehicle rear in order to improve the safety in a crash in the event of a rear impact.

What is claimed:

1. A chassis auxiliary-frame arrangement on a preferably self-supporting vehicle body having a pair of laterally-spaced, longitudinal support members for improving safety during an impact comprising:
   a chassis auxiliary frame;
   two front means for fastening the chassis auxiliary frame to each longitudinal member,
   two rear means for fastening the chassis auxiliary frame to the vehicle body comprising a pair of fastening plates weakened in a defined manner with respect to longitudinal force by structural means; and
   a ramp device;
   wherein said fastening means are sheared off after a certain relative force between the longitudinal members and chassis auxiliary frame and the entire chassis auxiliary frame is pushed under a passenger cell when the vehicle is severely deformed in a frontal impact.

2. The chassis auxiliary-frame arrangement of claim 1, wherein the front means for fastening the chassis auxiliary frame to the longitudinal member is designed as a support pipe.

3. The chassis auxiliary-frame arrangement of claim 2, wherein the support pipe is connected to the longitudinal member of the vehicle body by means of a shearing-screw connection which shears off after a certain relative longitudinal force between the longitudinal member and chassis auxiliary frame.

4. The chassis auxiliary-frame arrangement of claim 1, wherein the rear means for fastening the chassis auxiliary frame to the vehicle body is designed as a fastening plate which is frictionally connected to the chassis auxiliary frame and to the vehicle body in the region of the passenger cell.

5. The chassis auxiliary-frame arrangement of claim 4, wherein the frictional connection of the fastening plate on the chassis auxiliary frame and on the vehicle body in the region of the passenger cell is designed as a screw connection.

6. The chassis auxiliary-frame arrangement of claim 4, wherein the defined weakening of the fastening plate is designed as at least one hole, with the result that, after the fastening plate is subjected to a longitudinal force, it buckles away rearward.

7. The chassis auxiliary-frame arrangement of claim 1, wherein a front, lower section of the ramp device and an upper, rear section of the chassis auxiliary frame are formed by means of a curvature in such a manner that they cannot become hooked in each other during a movement relative to each other, and so the entire chassis auxiliary frame is always pushed under the passenger cell if the vehicle is severely deformed in a frontal impact.

8. The chassis auxiliary-frame arrangement of claim 1, wherein the chassis auxiliary frame is designed as a flexurally rigid and torsion-resistant chassis element.

9. The chassis auxiliary-frame arrangement as claimed in claim 8, wherein the chassis auxiliary frame comprises flexurally rigid and torsion-resistant front axle frames which are connected to the vehicle body.

10. A method for improving a self-supporting vehicle during a frontal impact of a vehicle body having a pair of laterally-spaced longitudinal support members and a chassis auxiliary-frame arrangement connected thereto, the connection comprising two front points and two rear points wherein each front point is attached to a longitudinal member by means of a support pipe and a front shearing screw and each rear point is connected to the vehicle body by means of a rear fastening plate having a weakened portion, the method comprising the steps of:

deforming a front portion of the body at the start of the impact before at least one deformation zone of the vehicle body begins to deform;

displacing the chassis auxiliary-frame rearward by said deformation of the front portion of the body such that the rear fastening plate starts to buckle in the region of the weakening portion and the longitudinal member moves relative to the chassis auxiliary frame;

sheering off each of the front shearing-screw connections of the support pipe by said movement of each longitudinal member;

detaching completely the chassis auxiliary frame from the vehicle body at the rear fastening plate after the rear fastening plate has completely buckled away, and pushing the complete chassis auxiliary frame under the passenger cell by means of a sheet-metal ramp while at least one deformation zone of the vehicle body continues to be deformed without interference from the chassis auxiliary-frame.

11. The method of claim 10 wherein the front portion of the body includes a radiator support or wheel house.

* * * * *